H. W. RICHARDS.
CLUTCH MECHANISM.
APPLICATION FILED MAR. 22, 1915.
1,184,130.
Patented May 23, 1916.
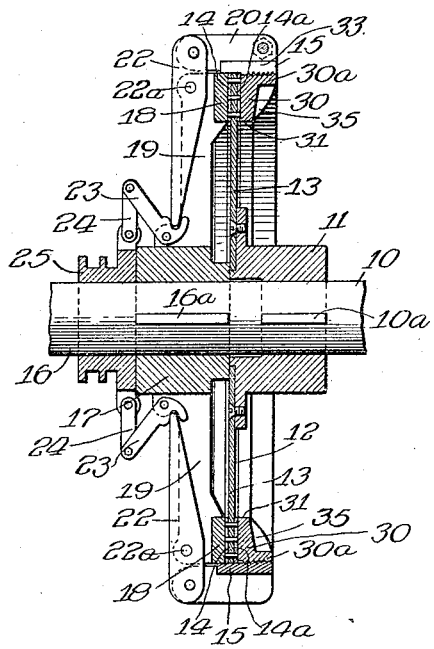
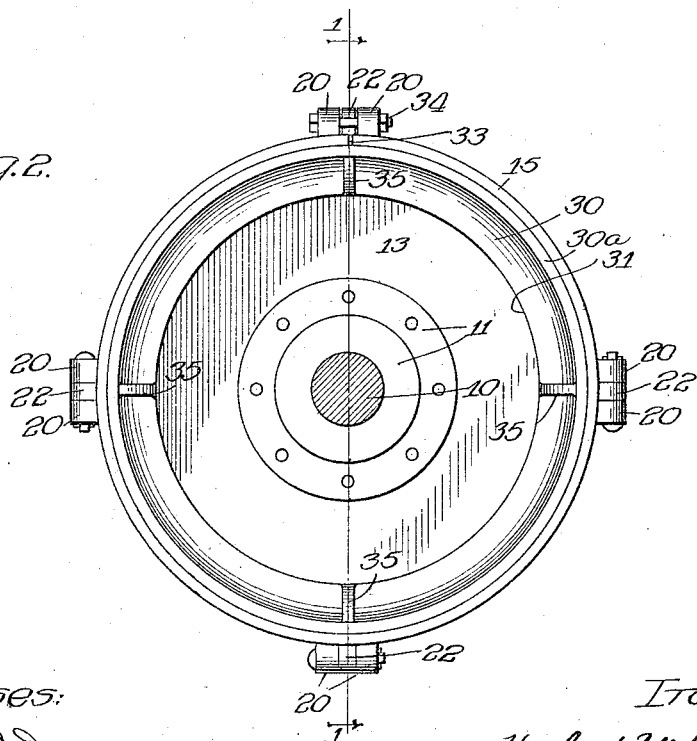
Witnesses:
Fred C. Davison
E. H. Rousner
Inventor:
Herbert W. Richards
By Luther Johns, Atty

UNITED STATES PATENT OFFICE.

HERBERT W. RICHARDS, OF OAK PARK, ILLINOIS.

CLUTCH MECHANISM.

1,184,130.  Specification of Letters Patent.  Patented May 23, 1916.

Application filed March 22, 1915. Serial No. 16,157.

*To all whom it may concern:*

Be it known that I, HERBERT W. RICHARDS, a citizen of the United States, residing in the village of Oak Park, county of Cook, and State of Illinois, have invented certain new and useful Improvements in Clutch Mechanism, of which the following is a specification.

My invention relates to clutch mechanism, and more particularly to such as employ friction elements for transmitting motion from the driving to the driven member thereof.

The principal objects of the invention are to improve the construction and efficiency of clutches wherein a friction element is operatively clamped between wear elements for communicating rotative motion, and to render simple and easy the uniform adjustment of a wear element thereof whereby time and labor are saved and the clutch is preserved from injury due to unequal adjustment; also to render the assembling, repair and substitution of parts simple and readily to be made.

A specific and important object is to improve the construction, efficiency and adjustability of clutching parts, in clutches of the character herein specifically illustrated and described.

Other objects and advantages will appear hereinafter.

In the accompanying drawings, which form a part of this specification, I have illustrated the application of these improvements in a preferred way to a friction clutch of a well known type.

In these drawings Figure 1 is a section of the mechanism on a vertical plane through the common axis of the shafts, as on the line 1—1 of Fig. 2; and, Fig. 2 is an elevation of the side thereof containing my improved adjusting means.

In the specific device illustrated all of the operative elements and combinations are old and well known in the art with the exception of those providing the feature of adjustment hereinabove referred to and the combinations thereof with clutch mechanism elements as more particularly pointed out in the appended claims.

For a full understanding of the device shown it will only be necessary to mention that the shaft 10 carries positively the flanged hub or collar 11, as by the feather $10^a$, to which hub is secured positively, as by screws or bolts, the friction element 12 comprising the disk-like steel plate 13 having annular friction surfaces 14 and $14^a$, suitably built up of wooden studs and compressed fiber. About the peripheral portion of the friction element 12 is the carrying element 15, preferably annular and normally out of contact with the friction element 12. The shaft 16 carries positively the hub or collar 17, secured as by the key or feather $16^a$, which hub in turn carries the annular wear element 18, as at the extremities of the radial arms 19 rigid with the collar 17. The carrying element 15, ordinarily called the hood, is provided with a plurality of upstanding lugs 20 equally spaced apart in pairs for pivotally mounting the levers 22, which levers 22 are also pivoted, as at $22^a$, to the unitary part comprising the wear element 18, the arms 19 and the hub 17, the levers 23 being pivotally mounted on the arms 19 and connected by the pivotally mounted links 24 respectively to the shifting sleeve 25 slidable on the shaft 16. Heretofore, so far as I am aware, in the specific type of clutch illustrated the wear element coöperating and coacting with the wear element 18 to bind the friction element 12 between them has been in constantly fixed relation to the carrying element or hood 15 or its equivalent, and the relative position of such relatively fixed wear element has been substantially the same as that of the wear element 30. That is to say, if I were to show my improved wear element 30 as integral with the element 15 and omit the wear element locking means the construction would be substantially in accordance with what is well known in the art. My improved wear element 30, however, is an adjustable one, and is adjustable simultaneously and equally over its entire wearing or clamping surface, by which I mean the surface adapted to contact the friction element 12 for locking engagement therewith. It is therefore adapted to preserve a true plane of rotation, in the specific construction shown, at right angles to the axis of the shafts 10 and 16, these shafts being, of course, coaxial. It has also the property of adjustment by relatively minute gradations; and means are also provided for locking it in any desired relative position. I embody the invention in these important respects preferably in a wear element annular in shape, and preferably having a relative large opening, as diametrically between the inner edges 31 thereof to permit its ready application over the hub 11, as well as to save weight, in the specific form of clutch shown, this ring 30 preferably being only deep enough radially to provide the desired friction or clutching surface thereon. In ordinary practice it has substantially the same radial dimensions as has the wear surface of the element 18. It preferably has a flange 30ª to provide strength as well as a reasonably wide peripheral surface for threading. As illustrated, it interfits with the carrying or hood element 15, interfitting screw threads being preferably provided on these members, as shown in Fig. 1.

The wear element 30 is thus adjustable with respect to the wear element 18 whereby the friction element 12 may be bound between the two wear elements as tightly or as loosely as may be desired. If the element 30 is too far retracted by turning it relative to the element 15 in an unscrewing direction the clutch naturally will not operate when the shifting sleeve 25 is moved, and if the element 30 is advanced too far it will be impossible for the workman to throw the clutching levers into their locked position whereby the driving and driven members of the clutch are locked together. As the element 30 always moves with its wearing surface true to the plane of its rotation when adjustments are made no injury can result to the clutch from trials and experiments during the adjusting operation, and as all parts of the wear surface of the element 30 are adjusted simultaneously, the workman is concerned only with the degree of adjustment required. By experience or from a trial or two he can readily make the desired adjustment to a nicety. Such adjustments are required from time to time to take up wear or when a new friction element, as 12, is inserted.

My preferred means for holding the element 30 in relatively fixed relation to the hood or carrying element, as 15, after an adjustment has been made, comprise the provision of a cut or opening in the carrying or hood element 15, and means for binding this element 15 tightly upon the element 30. In practice the element 15 is a split ring, the split or opening being shown at 33, Fig. 2, between two of the lugs 20, the binding screw or bolt 34 being adapted to draw together the end walls of the element 15 at the slot 33, thus holding the element 30 against turning. When the bolt 34 is loosened slightly the element 30 is free to be moved adjustably or to be entirely removed, and it is only necessary for the workmen to insert a tool, as a chisel, wedgingly in the slot 33 and pry the end walls of the element 15 apart by an easy movement of the hand to free the ring 30 to such an extent that it may then easily be adjusted by hand. The lugs 35 integral with the element 30 not only strengthen the ring 30 but provide rests or finger pieces for exerting rotative pressure thereupon.

When the shifting sleeve 25 is moved toward the collar 17, as shown in Fig. 1, the wear element 30 is moved toward the friction element 12, slightly bending dish-shaped the steel plate 13 and forcing the friction surface 14 against the wear surface of the element 18, the friction element 12 being tightly clamped between the wear elements 30 and 18. When the sleeve 25 is moved in the direction away from the hub 17 the wear or pressure binding element 30 is moved away from the friction element or, as they may be termed, the binding elements 12 which is then automatically freed from the resistance binding elements 30 and 18. In the device shown the wear element 18 is normally relatively fixed while the binding element is movable for clutching operations and is also adjustable.

While I have illustrated and described a preferred embodiment of these improvements as applied to a certain type of clutch it will be apparent to persons skilled in the art that various changes and modifications may be made in the embodiment of the invention and in its application to other types of clutches, all within the spirit of this disclosure, and all such changes and modifications are contemplated by me as fall within the scope of the appended claims.

I claim:

1. In a clutch, the combination of a driving member and a driven member coaxially mounted for rotation, a pair of wear elements carried by one of said members, and a friction element carried by the other thereof, said wear elements being in operatively opposed relation to each other with said friction element operatively between them, means operatively associated with one of said wear elements for moving the other thereof toward and from said friction element in clutching and unclutching operations, said other wear element being mounted to move also adjustably toward and from said friction element, said adjustable mounting being such that said adjustable wear element moves simultaneously and uniformly throughout its entire wear surface when adjustments thereof are made, and means for holding said adjustably mounted wear element in various relative adjustments thereof.

2. In a clutch, the combination of a driving clutch member and a driven clutch member coaxially mounted for rotation, one of said members carrying a pair of wear elements having wear surfaces operatively opposed to each other, a friction element positively carried for rotation by said other member between said wear elements, means operatively associated with one of said wear elements for moving the other thereof toward and from said friction element in clutching and unclutching operations, said other wear element being threaded upon said carrying clutch member whereby it may be moved adjustably toward and from said friction element, and means for holding said threaded wear element in adjusted position, the arrangement being such that the clutching movement of said adjustable wear element is adapted to bind said friction element in driving relation to said wear elements.

3. In a clutch, the combination of a driving clutch member and a driven clutch member coaxially mounted for rotation, a pair of wear elements having annular wear surfaces substantially opposed to each other carried by one of said members and a friction element carried by the other of said members and having friction surfaces adapted to be engaged by said wear surfaces respectively, means operatively associated with one of said wear elements for moving the other thereof into and out of binding engagement with said friction element against the resistance of said first mentioned wear element, said other wear element being threaded in the clutch member carrying the same whereby said adjustably threaded wear element may be moved adjustably toward and from said friction element, and means for releasably holding said adjustably threaded wear element in fixed relation to the clutch member carrying the same.

4. In a clutch, the combination of a driving member and a driven member coaxially mounted for rotation, a pair of clutching elements carried by one of said members, and a friction element carried by the other thereof and operatively between said clutching elements, said friction element having an annular friction surface on one side thereof, one of said clutching elements having an annular friction surface adapted to contact the friction surface on said friction element, one of said clutching elements being adapted to take the pressure of the other thereof through said friction element when one clutching element is clamped upon said friction element, and means for clamping one of said clutching elements upon said friction element, one of said clutching elements being threaded into the member carrying the same whereby it may move adjustably toward and from said friction element, and means for holding said adjustably mounted clutching element in various relative positions of adjustment.

5. In a clutch, the combination of a driving clutch member and a driven clutch member coaxially mounted for rotation, a pair of wear elements and a split ring element carried by one of said members, said wear elements having annular wear surfaces substantially opposed to each other, one of said wear elements being adjustably threaded into said split ring whereby it may be moved adjustably toward and from said other wear element, means for binding said split ring element upon said adjustable wear element, one of said wear elements being movable toward and from the other thereof in clutching operations, means for moving said wear element toward and from the other thereof in clutching operations, the other clutch member having a friction element having annular friction surfaces adapted to rotate between the annular wear surfaces of said wear elements respectively, the arrangement being such that by moving said clutching wear element toward the other wear element in a clutching operation said friction element is clamped between them.

6. In a clutch, the combination of a driving member and a driven member coaxially mounted for rotation, an operative wear element and a normally relatively fixed wear element carried by one of said members, said wear elements having annular wear surfaces substantially opposed to each other, means for moving said operative wear element toward and from said normally fixed wear element, said operative element being adjustably mounted upon the member carrying the same whereby it moves simultaneously and uniformly throughout its entire wear surface toward or from said normally fixed wear element when a single adjustment thereof is made, means for holding said adjustably mounted wear element in various relative adjustments, the other member of said clutch having a friction element having annular friction surfaces adapted to rotate between said wear surfaces respectively, the arrangement being such that by moving said operative wear element toward said normally fixed wear element said friction element is clamped between them.

7. A clutch comprising in combination clutching members coaxially arranged for rotation, a friction element on one and clutching elements on the other of said members, said friction element being adapted to be clamped between said clutching elements in clutching operations, the member carrying said clutching elements including a split ring, one of said clutching elements being threaded into said split ring whereby it may move adjustably toward and from the other clutching element, and means for holding said adjustably mounted element in various relative positions of adjustment.

8. In a clutch having clutching members coaxially arranged for rotation, the combination therewith of a pressure clutch element and a resistance clutch element, a friction element intermediate said pressure element and said resistance element, said pressure element being adapted to bind said friction element between said pressure element and said resistance element, means for moving said pressure element toward and from said resistance element in clutching operations, the member carrying one of said clutch elements including a split ring, said last mentioned clutch element being adjustably threaded in said split ring, and means for holding said adjustable element in various relative positions of adjustment.

9. In a clutch, the combination of driving and driven members coaxially arranged for rotation, one of said members carrying a pressure binding element and a resistance binding element, the other of said members carrying a friction element intermediate said pressure binding element and said resistance binding element, each of said binding elements having an annular wear surface toward said friction element and being adapted to bind said friction element between them whereby said driving and driven members are substantially locked together for simultaneous rotation, means for moving said pressure binding element toward and from said resistance binding element in clutching and unclutching operations, one of said binding elements being adjustably mounted to move simultaneously and uniformly throughout its entire wear surface toward and from said friction element when a single adjustment thereof is made.

HERBERT W. RICHARDS.

Witnesses:
MILTON T. MILLER,
M. M. KRIESAUD.

Copies of this patent may be obtained for five cents each, by addressing the "Commissioner of Patents, Washington, D. C."

Correction in Letters Patent No. 1,184,130.

It is hereby certified that in Letters Patent No. 1,184,130, granted May 23, 1916, upon the application of Herbert W. Richards, of Oak Park, Illinois, for an improvement in "Clutch Mechanism," an error appears in the printed specification requiring correction as follows: Page 2, strike out lines 70 to 88, inclusive, and insert the following paragraph:

*When the shifting sleeve 25 is moved toward the collar 17, as shown in Fig. 1, the wear element 30 is moved toward the friction element 12, slightly bending dish-shaped the steel plate 13 and forcing the friction surface 14 against the wear surface of the element 18, the friction element 12 being tightly clamped between the wear elements or, as they may be termed, the binding elements 30 and 18. When the sleeve 25 is moved in the direction away from the hub 17 the wear or pressure binding element 30 is moved away from the friction element 12 which is then automatically freed from the resistance binding element 18. In the device shown the wear element 18 is normally relatively fixed while the binding element 30 is movable for clutching operations and is also adjustable.;* and that the said Letters Patent should be read with this correction therein that the same may conform to the record of the case in the Patent Office.

Signed and sealed this 27th day of June, A. D., 1916.

[SEAL.]
R. F. WHITEHEAD,
*Acting Commissioner of Patents.*